United States Patent Office 3,716,035
Patented Feb. 13, 1973

3,716,035
FUEL INJECTION CONTROL APPARATUS FOR INTERNAL COMBUSTION ENGINES
Karl-Heinz Adler, Leonberg, Heinrich Knapp, Leonberg-Silberberg, and Konrad Eckert, Stuttgart, Germany, assignors to Robert Bosch GmbH, Gerlingen-Schillerhohe, Germany
Filed Nov. 18, 1971, Ser. No. 199,946
Claims priority, application Germany, Dec. 3, 1970,
P 20 59 483.6
Int. Cl. F02b 3/00
U.S. Cl. 123—32 EA        10 Claims

ABSTRACT OF THE DISCLOSURE

The position of a positioning member which controls the amount of fuel to be injected into an internal combustion engine is determined by deriving a signal representative of engine speed, modifying the signal to obtain an output reflecting engine characteristics, and then controlling with the modified signal the position of a cam, preferably a three-dimensional cam, the position of the cam being additionally controlled by the position of the accelerator for the engine. A signal is derived from a cam follower, and this signal is additionally affected by a correction unit correcting for changes in ambient air pressure, temperature of the engine, or ambient conditions, or the like, so that the final output controlling the setting of the positioned member which determines the amount of fuel injected will be representative of engine characteristics, the accelerator position, and ambient conditions as sensed by the correction unit.

---

The present invention relates to fuel injection apparatus for internal combustion engines, and more particularly for Otto-type engines in which the amount of fuel is determined by a controlled element, the position of which depends on at least one operating parameter of the internal combustion engine.

It is an object of the present invention to provide a control system which is so arranged that it provides ready access into the control loop to effect corrections, the corrections themselves being representative of operating parameters of the internal combustion engine, or of physical values representative of changes in the environment in which the engine is placed. Thus, both the ambient conditions of the environment in which the engine operates can be considered, as well as the characteristics of the engine itself, when the amount of fuel to be injected is to be determined.

Subject matter of the present invention.—Briefly, a positioned member controls the amount of fuel to be injected. A mechanical-electrical transducer provides an output signal representative of engine speed, which is modified in accordance with engine operating characteristics, the modified output signal determining the position, in one direction, of a cam, preferably a three-dimensional cam. The position of the cam is additionally affected by the setting of an accelerator control. A cam follower changes its position, in accordance with change of position of the cam, and a signal is derived representative of cam follower position which is fed back to control the amount of fuel to be injected. This signal, additionally, is affected by a correction value derived from a correction unit which is sensitive to additional parameters, such as ambient conditions (ambient air pressure, temperature or the like) or engine operating conditions (engine temperature, for example).

Figure 1:
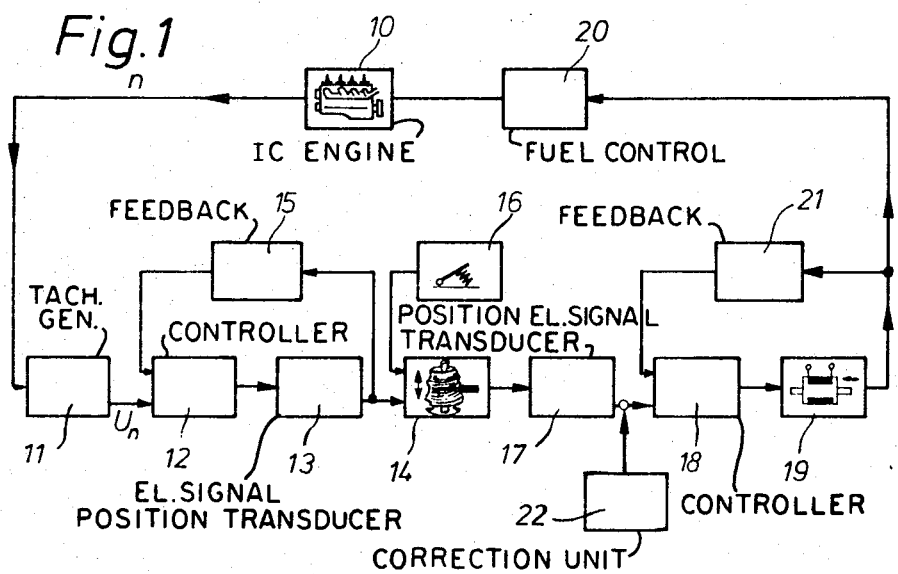
Figure 2:
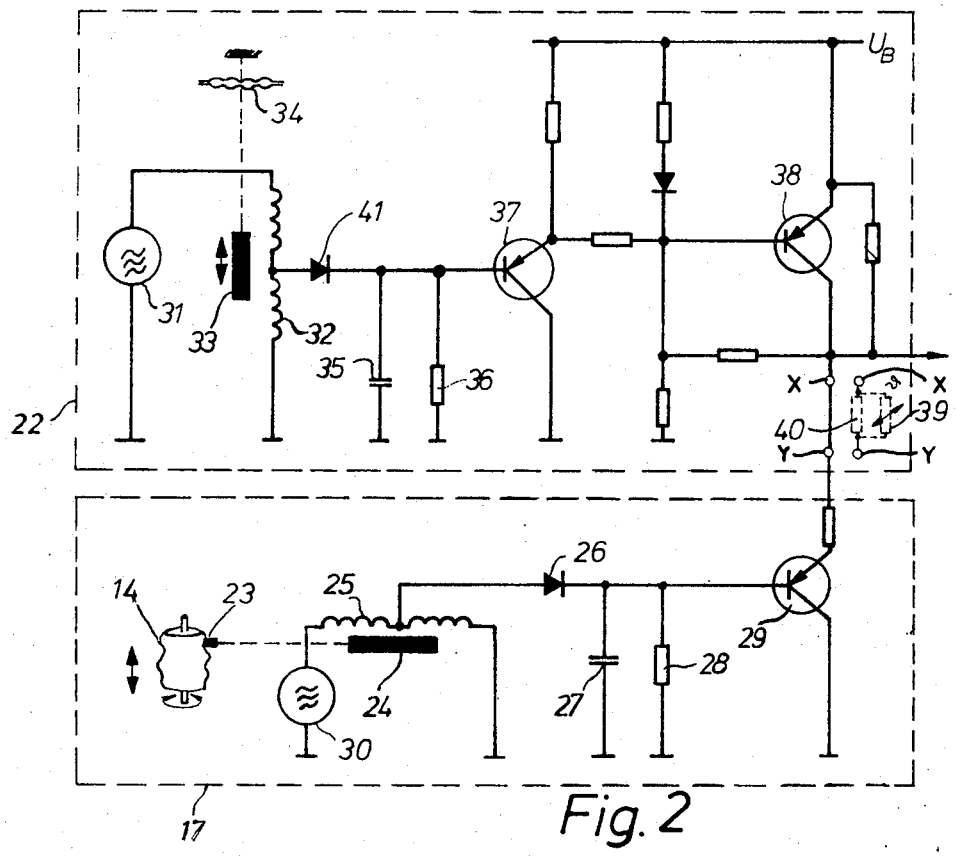

The invention will be described by way of example with reference to the accompanying drawings, wherein:

FIG. 1 is a general schematic block diagram of the control loop for an internal combustion engine; and FIG. 2 is a specific schematic circuit diagram of a mechanical electrical transducer in the control loop, and a correction circuit to effect corrections electrically in the signal within the control loop.

Referring now to FIG. 1: An internal combustion engine, such as an Otto engine 10 has a mechanical electrical transducer, such as a tachometer generator 11 coupled to its output, to provide an output signal $U_n$ representative of engine speed $n$. The voltage $U_n$ representative of engine speed is applied to a controller 12 which has a transfer characteristic matching the speed-fuel requirement characteristics of the engine 10. The output from controller 12 is applied to an electrical signal-position transducer 13, such as a magnet, which positions a cam 14. Cam 14 is preferably a three-dimensional cam, which is rotated in accordance with the output signal from transducer 13. The displacement angle of the cam 14 thus bears a relationship to the speed of the internal combustion engine 10. To provide for accuracy, a feedback circuit 15 connect an output signal from the transducer 13 back to controller 12, so that the actual position of the displacement element in the electrical signal to position transducer 13 will accurately reflect the signal from controller 12.

The position of the cam 14 is further affected by an operator controllable element, such as an accelerator control coupled to the throttle of the internal combustion engine 10. Such a control, for example accelerator pedal 16, changes the position of the cam 14 upwardly or downwardly, with respect to the drawings, so that a specific point on the cam 14 will reflect both the speed of the engine $n$ as well as the position of accelerator pedal 16.

A cam follower 23 engages cam 14. The position of the cam follower 23 is sensed by position-to-electrical signal transducer 17, and the resulting signal from transducer 17 is applied to a controller 18. The signal transmitted from transducer 17 to controller 18 is additionally affected by a correction unit 22. The input to the controller 18 thus will contain information regarding the speed of the engine, the position of the accelerator pedal 16 and, if applicable, corrections entered by correction unit 22.

The output of controller 18 is connected to an element 19 which eventually controls the amount of fuel to be injected. Unit 19 may, for example, include a positioning magnet which controls directly valves, or the like, schematically indicated at 20, admitting fuel, or providing fuel under pressure to the internal combustion engine 10. To control the position of a magnet 19, and to provide accurate signal transfer, a feedback circuit 21 is connected to the output of circuit 19, to provide a position feedback signal, and connect it back to the input of controller 18. The details of such feedback loops are well known.

The correction unit 22, and the mechanical-electrical transducer 17 are illustrated in greater detail in FIG. 2. Can follower 23 is mechanically connected to core 24 of a center tapped coil 25, which is, in turn, supplied by an oscillator 30. Cam follower 23 thus will have a position which is representative of the specific position of cam 14 and changes the position of core 24 within the tapped coil 25, as the position of the cam changes, both vertically and angularly. Changing the position of the core changes the inductivity of coil 25, that is, the relative inductivity of the two windings. The anode of a diode 26 is connected to the tap of the coil 25, the cathode of which is connected to a condenser 27 and a resistance 28 and then to the base of an output transistor 29. One side of the coil 25 is connected to ground, the other to the oscillator 30. The voltage induced in coil 25 will thus depend on the position of core 24, and thus of the position of cam follower 23 on cam 14. The demodulator circuit comprising diode 26, and condenser and resistors 27, 28 respectively thus control the conductivity of transistor 29.

The output of transducer 17 is connected, as has been noted, to the output of correction unit 22. Correction unit 22 includes an oscillator 31 (which may be common with oscillator 30 and connected to unit 22 over a decoupling network), which is connected in turn to tapped coil 32 having a movable core 33. The position of core 33 changes with changes in ambient conditions of environment of the internal combustion engine, or other operating parameters; as shown, the core 33 is connected to an atmospheric pressure sensing element 34, such as a membrane. The voltage induced in coil 32 will depend on the position of core 33, and thus will depend on pressure of ambient air within which the engine operates. The alternating voltage from oscillator 31 induced in coil 32, the value of which is modified or determined by the position of membrane 34, is demodulated in a demodulator circuit including diode 41, and condenser-resistance network 35, 36. The direct current signal, representative of ambient air pressure, is used to control the conductivity of a pnp transistor 37 which is connected in a known circuit to control the conductivity of an output transistor 38. The emitter-collector path of transisor 38 is connected to the emitter-collector path of output transistor 29 of conroller 18. A pair of junction points X, Y, can be short-circuited, as shown in solid line connection or, alternatively, can be switched to a network comprising a resistance 40 in parallel with a temperature dependent resistance 39, such as a negative temperature coefficient resistor. The resistance of the emitter-collector path of transistor 38 (as determined by the voltage applied to the base), the resistance of the circuit between junctions X, Y (either zero, or dependent on the resistance values of resistors 40, 39) and the resistance of the emitter-collector path of transistor 29, together with a limiting resistance, all form a voltage divider. The output from the voltage divider is taken at junction X, and applied to unit 19. This output signal, derived from junction X, is thus representative of the position of the cam 14 as well as of ambient air pressure as given by membrane 34 and, unless short-circuited, by the temperature sensed by resistance 39.

The negative temperature resistance can be utilized to ensure an enriched mixture if the engine is cold; thus, the voltage obtained at junction point X (with respect to negative or ground) will then depend on the temperature to which the resistance combination 39, 40 has been made sensitive, for example engine temperature. Other temperature values, such as ambient temperatures can likewise be considered.

Various changes and modifications may be made within the scope of the inventive concept.

We claim:
1. Fuel injection control apparatus for internal combustion engine (10) having a positioned member (19, 20), the position of which is representative of fuel to be injected, and which position is controlled in dependence on at least one of operating and environmental parameters of the engine, comprising
speed signal generating means (11) deriving an electrical speed signal ($U_n$) representative of engine speed $n$;
transfer circuit means (12) having a signal transfer characteristic specific to the engine (10), the speed signal being applied thereto and having a modified speed signal output;
a cam (14);
means (13) controlled by the modified speed signal affecting the position of the cam (14);
operator adjustable means (16) connected to the cam (14) additionally affecting the position of the cam;
a cam follower (23);
cam position signal generating means (17) deriving an electrical cam position signal representative of the position of the cam follower on the cam and thus of the combined effects of the modified signal and the setting of the operator adjustable means;
a control circuit (18) having the cam position signal applied thereto and generating a control signal to control the position of the positioned member (19, 20);
and a correction circuit (22) connected to superimpose its output on the signal from the cam position signal generating means, said correction circuit including means (34, 39) responsive to at least one: environmental; and operating parameters of the engine.

2. Apparatus according to claim 1, wherein the correction circuit is connected to the output of the cam position signal generating means (17).

3. Apparatus according to claim 1, wherein the correction circuit includes means (34) responsive to ambient air pressure.

4. Apparatus according to claim 1, wherein the correction circuit includes means (39) responsive to temperature.

5. Apparatus according to claim 1, wherein the cam position signal generating means comprises an output transistor (29) and the correction signal generating means comprises an output transistor (38), both the output transistors having their emitter-collector paths series connected and forming a voltage divider circuit.

6. Apparatus according to claim 5, including a temperature sensitive resistance (39) included in the series circuit of the emitter-collector path of the output transistors to additionally affect the output taken from the voltage divider.

7. Apparatus according to claim 5, wherein the correction signal generating means comprises an oscillator (31), a coil (32) having a movable core (33), the coil being connected to the oscillator, the position of the core (33) being representative of at least one of said parameters;
and a demodulator circuit (41, 35, 36) connected to the core and controlling the conduction of the output transistor (38) of the correction signal generating means.

8. Apparatus according to claim 7, including a coupling and amplification transistor (37) having its control electrode (base) connected to the output of the demodulator circuit and its output connected to the base of the output transistor (38).

9. Apparatus according to claim 5, wherein the cam position signal generating means comprises an oscillator (30) and a coil (25) and having a movable core (24);
the position of the core being controlled by the position of the cam follower (23) on the cam (14).

10. Apparatus according to claim 1, wherein the cam (14) is a three-dimensional cam.

References Cited

UNITED STATES PATENTS

| 2,950,706 | 8/1960 | Senckel | 123—139 E |
|---|---|---|---|
| 3,592,177 | 7/1971 | Wehde | 123—139 E |
| 3,630,177 | 12/1971 | Engel | 123—32 EA |
| 3,648,155 | 3/1972 | Soehner | 123—32 EA |
| 3,665,900 | 5/1972 | Schlimme | 123—32 EA |

FOREIGN PATENTS

| 1,094,528 | 12/1960 | Germany | 123—140 CC |

LAURENCE M. GOODRIDGE, Primary Examiner

C. R. FLINT, Assistant Examiner

U.S. Cl. X.R.

123—139 E